United States Patent [19]
Ohta

[11] 3,837,515
[45] Sept. 24, 1974

[54] INDUSTRIAL TRUCK
[75] Inventor: Shuji Ohta, Toyohashi, Japan
[73] Assignee: Toyota Automatic Loom Works, Ltd., Aichi-ken, Japan
[22] Filed: Sept. 20, 1972
[21] Appl. No.: 290,469

[30] Foreign Application Priority Data
Sept. 20, 1971   Japan.............................. 46-073188

[52] U.S. Cl............................. 214/730, 214/16.4 A
[51] Int. Cl............................................. B66f 9/14
[58] Field of Search.......... 214/16.4 A, 16.4 B, 730, 214/731

[56] References Cited
UNITED STATES PATENTS

| | | |
|---|---|---|
| 2,851,182 | 9/1958 | Gehring .............................. 214/730 |
| 3,166,209 | 1/1965 | Haddock, Jr. ...................... 214/730 |
| 3,659,733 | 5/1972 | Sinclair et al...................... 214/730 |

Primary Examiner—Robert J. Spar
Assistant Examiner—Lawrence J. Oresky
Attorney, Agent, or Firm—Browdy & Neimark

[57]                   ABSTRACT

An industrial "fork-lift" truck comprises a guide means, a load support means, and a pair of connecting means which support said load support means slidably along said guide means, rigidly by a novel connecting means having at least a line and a point support, and swingably only at each end of said guide means, by means of a novel hydraulic system which is controlled by a simple lever with a help of a few unique control valves.

9 Claims, 17 Drawing Figures

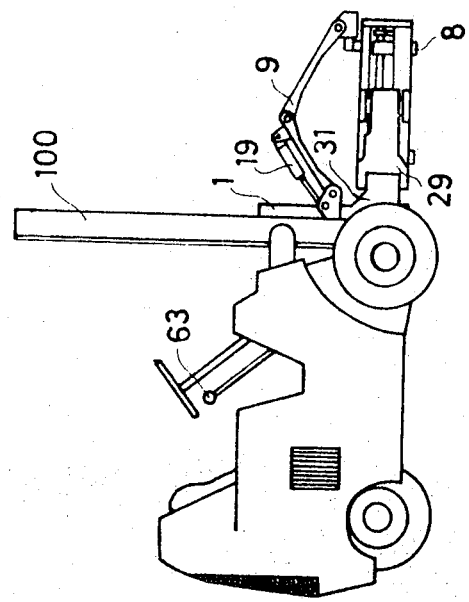
Fig. 1-A
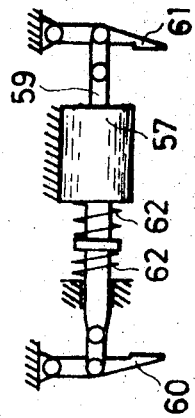
Fig. 5
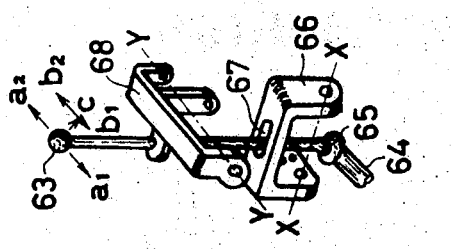
Fig. 4
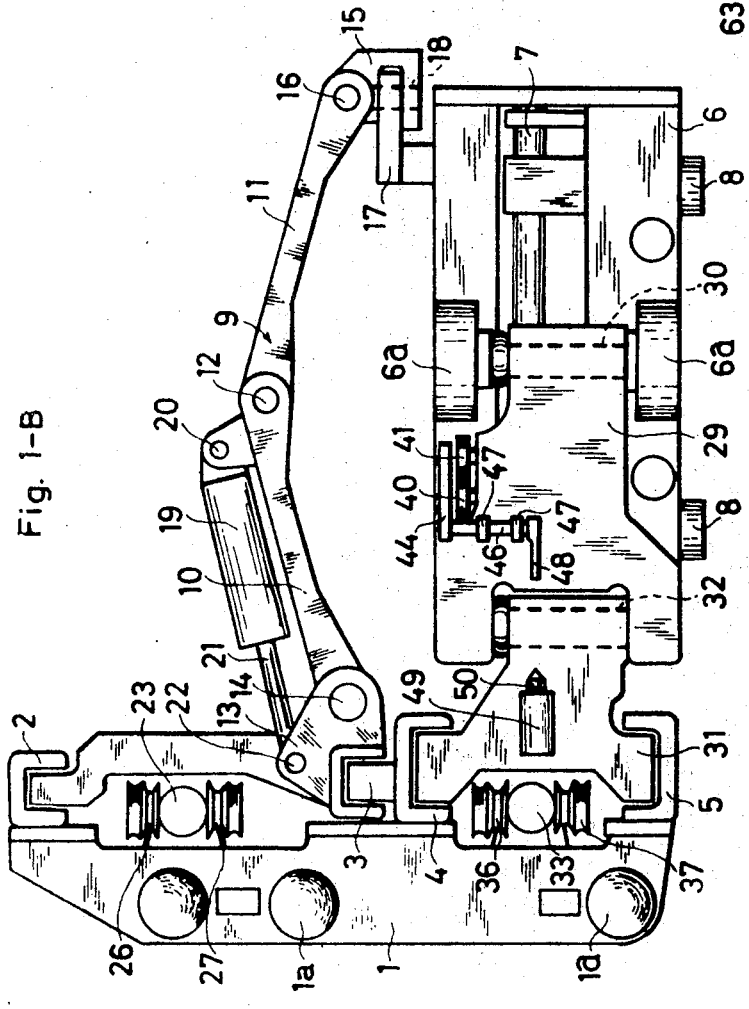
Fig. 1-B
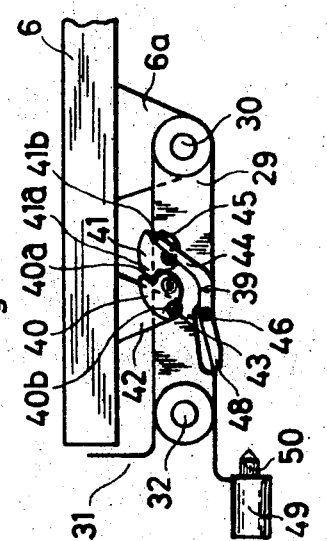
Fig. 2

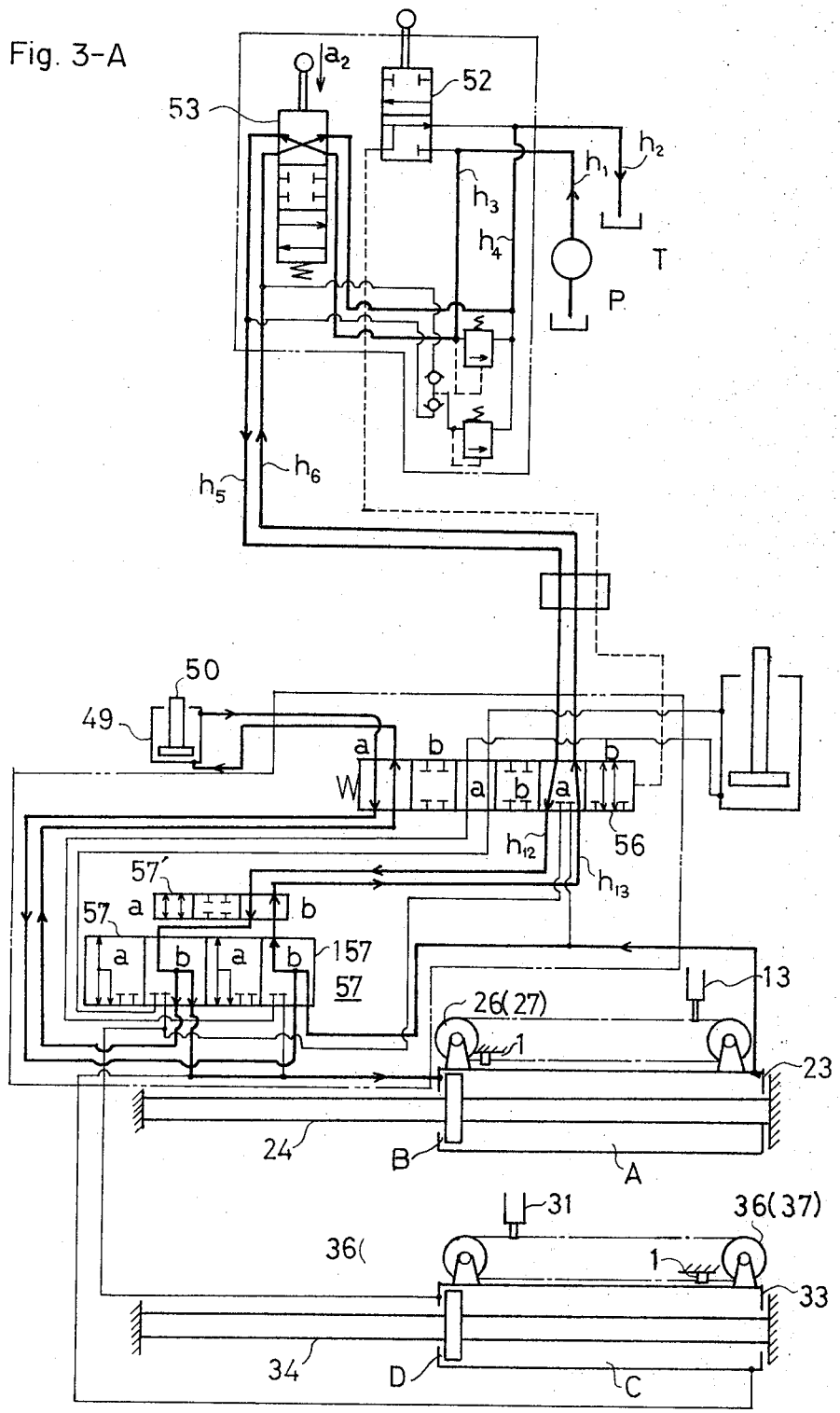

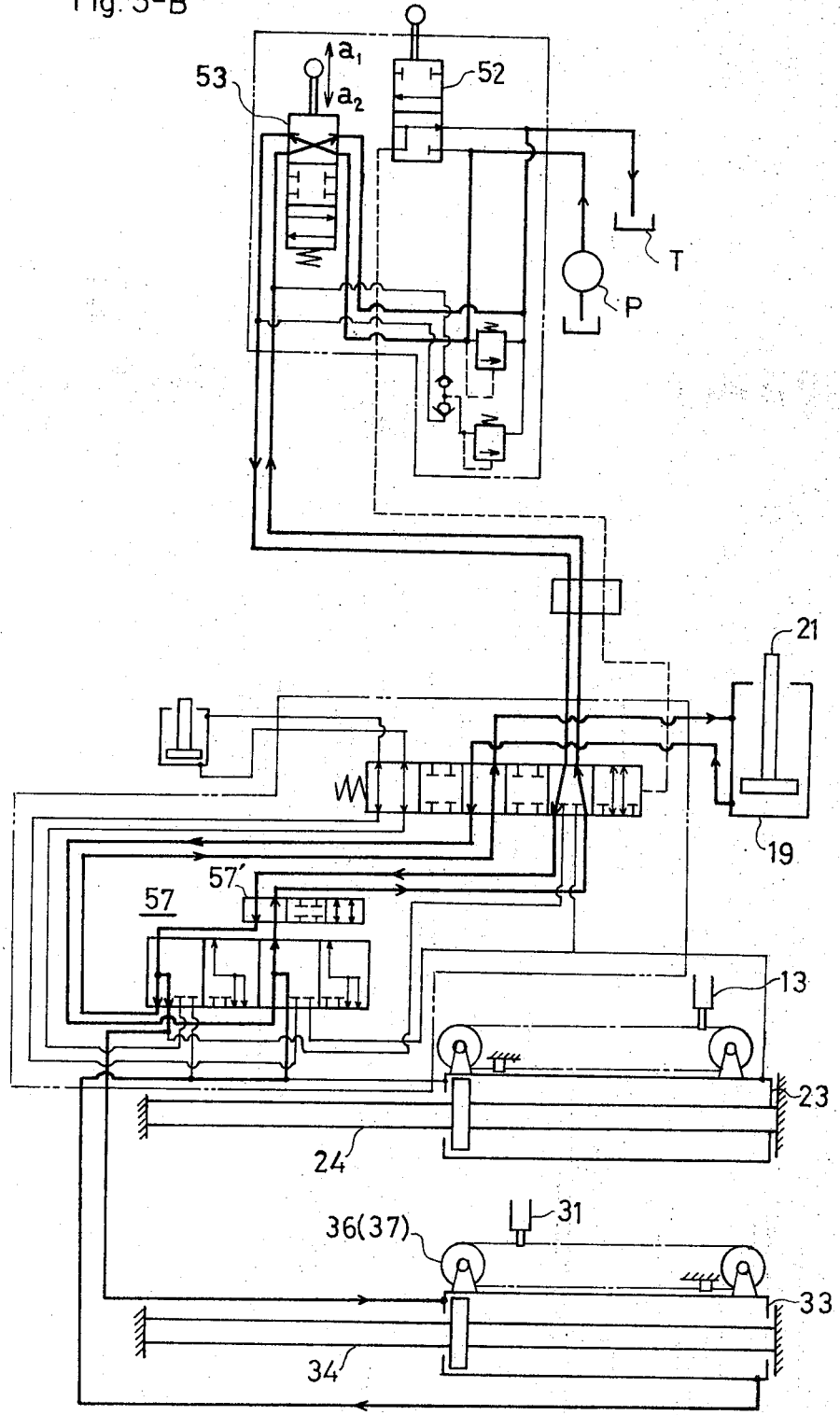

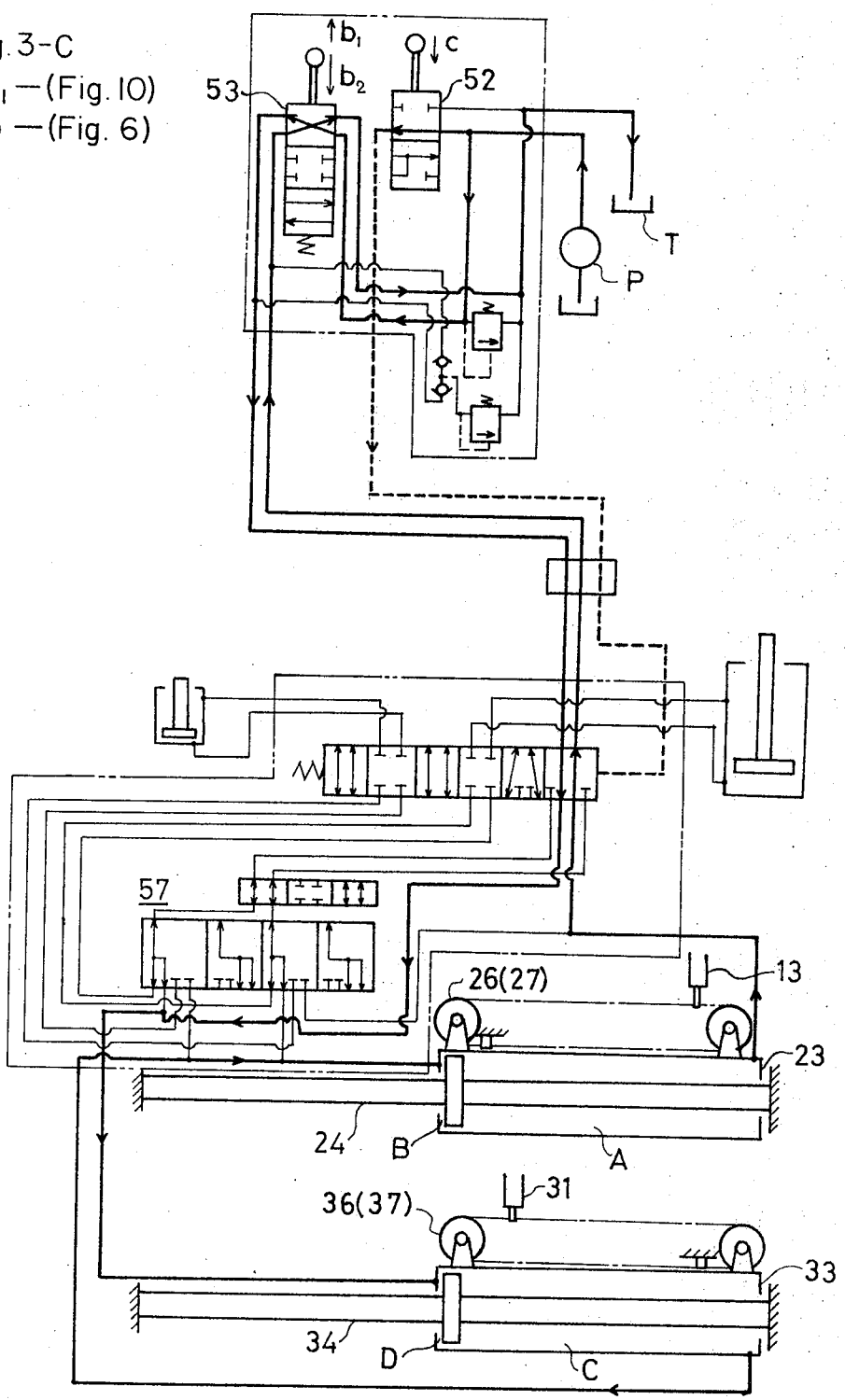
Fig. 3-C
$c, b_1$ — (Fig. 10)
$c, b$ — (Fig. 6)

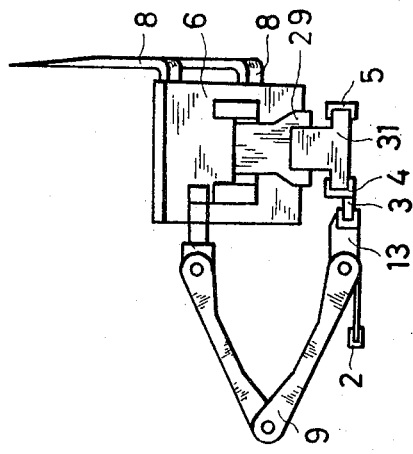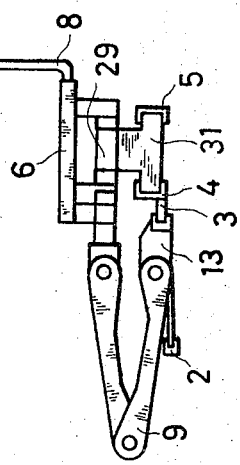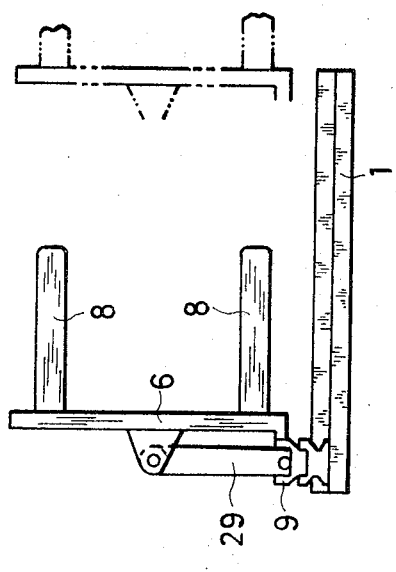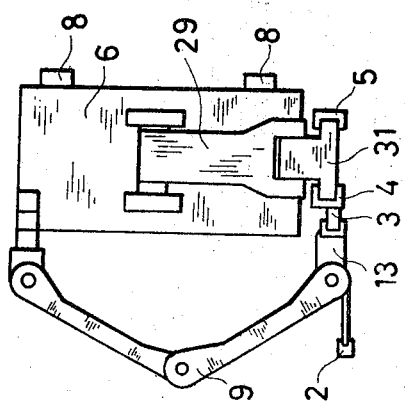

INDUSTRIAL TRUCK

The present invention relates to an industrial truck of the so-called "fork lift" type with a novel hydraulic system and which has a horizontal guide track along which a load support moves and which itself is movable up and down along an upright or uprights, and which can swing said load support up to 90° horizontally at each end of the horizontal guide track; i.e. an industrial truck which is operable in the narrowest aisle as narrow as the length of said guide track.

A number of patents have been issued to inventions which enable an industrial "fork-lift" truck to operate in a narrow aisle; however, so far as I know, no prior construction has been entirely successful.

The primary object of the present invention resides in the provision of a newly improved industrail fork lift type truck which is capable of fulfilling all the following functions in an aisle as narrow as the length of its guide member;

1. removing a load from a stack or a shelf on the front, left or right side of the aisle,
2. putting said removed load into another stack on the same side or even on the opposite side of the aisle at any level within the range of the lifting height of the load support means.

A further object of the present invention resides in the provision of an industrial fork-lift type truck having a pair of connecting elements which support a load stably by means of at least a line and a point (not a single line) and which enable the load support means to be swung to any angle up to 90° at the extreme of the guide track.

Another object of the present invention resides in the provision of an industrial fork-lift type truck having a hydraulic system including a pair of parallelly arranged double acting cylinders operable either simultaneously or independently, in order to traverse or to swing said load support means, a hydraulic jack to control a knee joint and another hydraulic jack to release a latch means which temporarily joins a carriage of said load support means with a connecting link arm by means of a spring force when said carriage becomes parallel to said link, as well as to push a side of said connecting link arm in order to increase an angle between said link arm and the guide track, and wherein the hydraulic system is arranged with some other control valves whose cooperative function makes the whole system controllable by a single lever.

Another object of the present invention resides in the provision of a newly improved industrial fork lift type truck in which only three hydraulic lines, i.e., one pressure line, one drain and one pilot line, pass from the truck body to the guide track; i.e., these minimal number of hydraulic lines minimize interference with the operator's sight, and reduces maintenance.

It is a still further object of the present invention to provide a novel load support means for trucks of the type specified above which is movable within an angle up to 180° in a horizontal plane.

Other objects and advantages of the present invention will be apparent from the following detailed description of an embodiment referring to the accompanying drawings in which:

FIG. 1-A is a perspective view of a fork lift truck embodying the teachings of the present invention;

FIG. 1-B is a side elevational view of an attachment movable up and down along the up-rights of the lift truck;

FIG. 2 is a partial plan view of FIG. 1-B;

Figure 3:
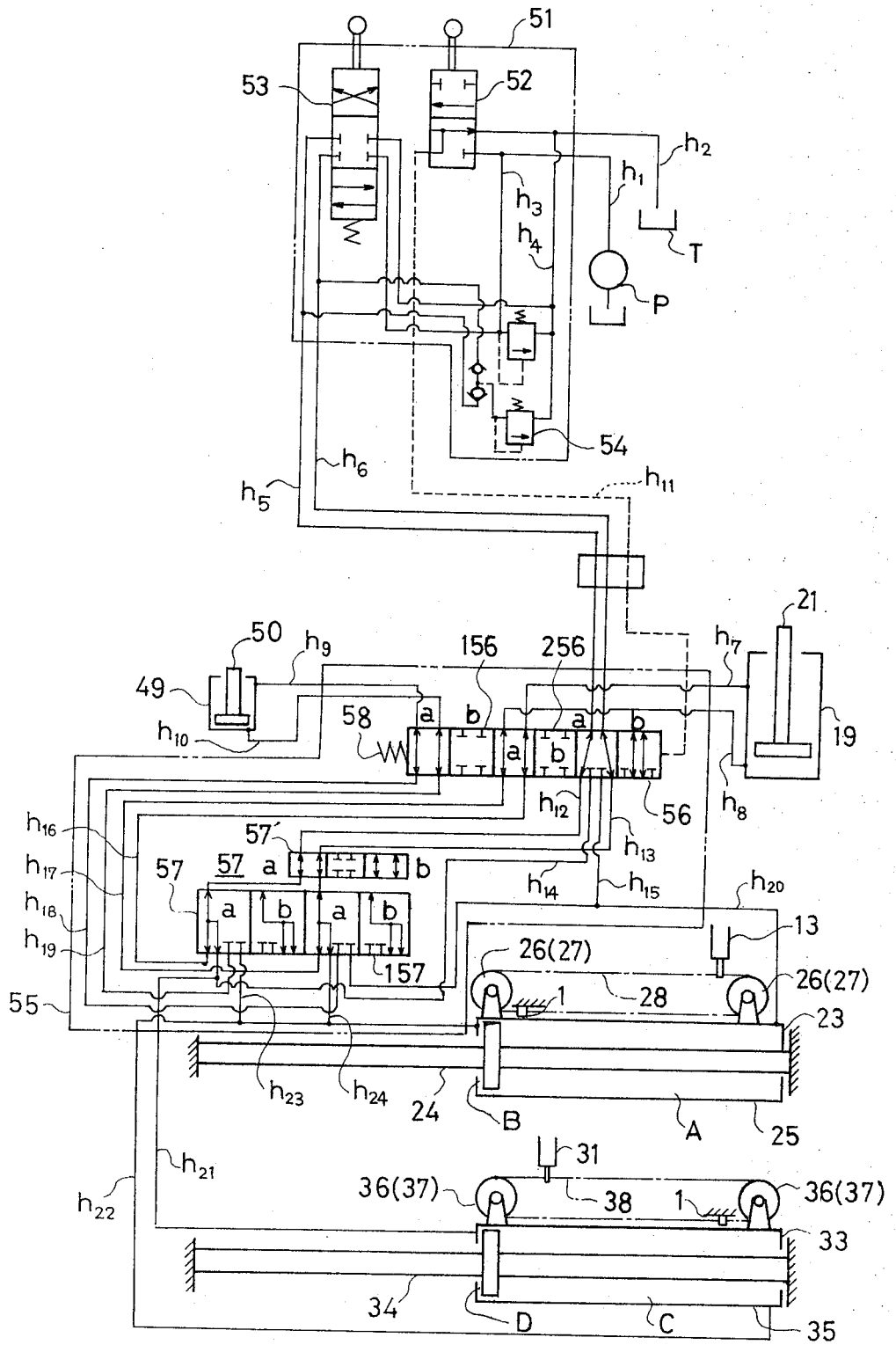
FIG. 3 is a hydraulic diagram showing the connection of various actuators and valves used in an embodiment of the present invention.
Figure 8:
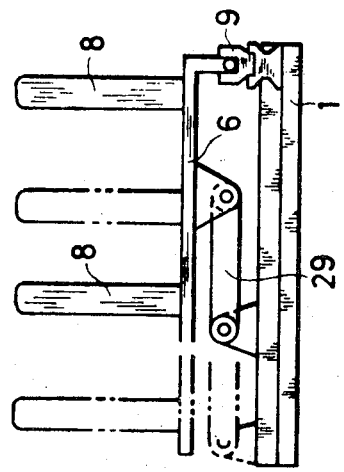
Figure 6:
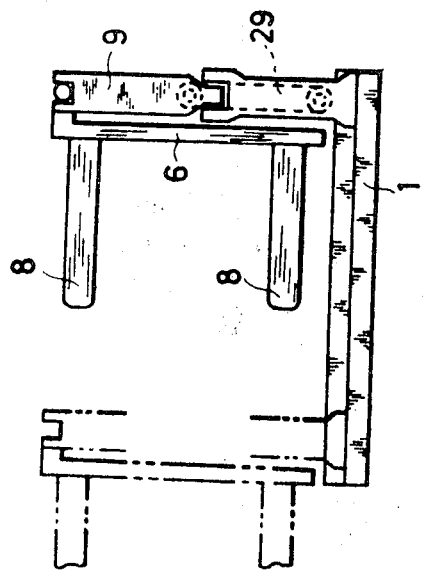
Figure 7:
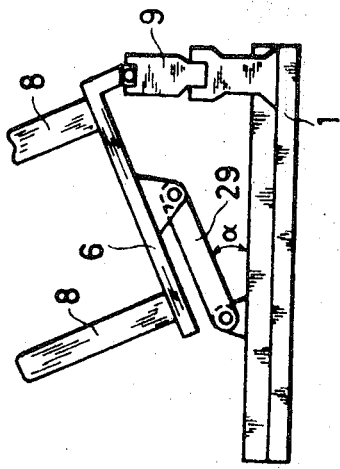

FIG. 3-A, -B and -C show respectively different phases of FIG. 3;

FIG. 4 is a perspective view of a single control lever in connection with two associated control links swingable respectively around axes X—X and Y—Y;

FIG. 5 is a diagrammatic view showing a controlling device of a valve used in the present invention;

FIGS. 6–10 are respectively diagrammatic plan views each showing a different phase of a load support means and a pair of connecting means;

FIGS. 11, 12 and 13 are respectively side views of FIGS. 6, 7 and 8.

The fork lift type truck of the present invention enables the following operations:

1. Swinging of a load upon the load support means laterally from a stack or a shelf either to the right or to the left at each end position of the guide track.
2. Straight-line sliding of the load laterally from a stack or shelf, followed by swinging of the load by up to 90° or vice versa.
3. Up and down movement of the load by movement of the guide track along an upright or uprights.
4. Forward and rearward movement of the load by movement of the truck itself.

All of the above operations can be carried out without remounting of the load support means.

Referring now to FIG. 1-A, there is shown an industrial fork-lift truck as an embodiment of the present invention, provided with a guide track 1 which is movable up and down along an upright 100 mounted to the truck body.

Along the guide track 1 is slidably mounted a load support means comprising a carriage 6 (see FIG. 1-B) and a pair of lifting forks 8 fixed thereto by means of a support bar 7.

The carriage 6 is hinged to a link arm 29 at one end thereof by means of a pin 30 which is supported by a pair of brackets 6a protruding from said carriage 6. The other end of said link arm 29 is also hinged, by means of a pin 32, to a slidable member 31 which is slidable along a pair of channel-shaped guide ways 4 and 5 horizontally arranged upon said guide track 1. The horizontal traverse motion of said slidable member 31 is controlled by a pair of endless chains 38, as shown schematically in FIG. 3, which are respectively arranged over a pair of sprocket wheels 36 or 37 fixed upon a movable cylinder 33 such cylinder 33 being mounted on the carriage 6. Each of said endless chains 38 has the slidable member 31 fixed thereto at a given position and at another point is crosswisely positioned to said guide track 1. The movable cylinder 33 is hydraulically movably engaged with a double-acting piston 34 the end of which is fixed to the guide track 1. From the construction mentioned above it may be understood that the movement of the slidable member 31 or link arm 29 can be controlled hydraulically by the movement of the cylinder 33.

Again referring to FIG. 1-B, another member 13 is slidably movable horizontally along the guide track 1, guided by a channel-shaped rail 2 and a rectangularly shaped rail 3. The slidable member 13 is connected to a pair of endless chains 28 arranged similarly as the chain 38 (referring to FIG. 3), over a pair of sprocket wheels 26 (or 27) fixed upon a movable cylinder 23 which is slidably engaged with a double acting piston 24 fixed to the guide track 1.

The slidable member 13 is hinged by a pin 14 to an end of a pair of links 10 and 11 whose adjacent ends are commonly hinged by a pin 12. The other end of the link 11 is hinged by a pin 16 to a connecting member 15 which is also hinged by a pin 18 to a bracket 17 itself fixed to the carrier 6. A hydraulic cylinder 19 is hinged to the link 10 and a piston 21 slidably engaged therein is also hinged to the slidable member 13 by a pin 22.

The angle between hinged links 10 and 11 making up knee joint 9 is controlled by the hydraulic piston 21, and the sliding movement thereof is controlled by the hydraulic cylinder 23.

By various co-operative movement of said knee joint 9 and the link arm 29 the carriage 6 with forks 8 can traverse, and swing as shown in FIGS. 6 – 10, for which detailed description appears below.

A latch means is provided to connect the carriage 6 to the link arm 29 temporarily only when they become parallel, as shown in FIG. 2. A pair of hooks 40 and 41 are rotatably fixed to the link arm 29 and pressed by springs (not shown) to engage mutually in such a manner as a convex part 41a of the hook 41 engages in a concave recess 40a of the hook 40, whereas another concave recess 40b engages with a pin 43 supported by the carriage 6 and another concave recess 41b engages a pin 45 supported by an arm 44. As the arm 44 and another arm 48 are both fixed to a shaft 46 which is rotatably supported by a bracket 47 fixed to the link arm 29, a hydraulic piston 50 whose cylinder 49 is fixed upon the slidable member 31 can release the latch means by pushing the arm 48 when the link arm 29 comes to a position perpendicular to the working direction of the piston 50.

The whole function of the novel attachment consisting of the guide track 1, the load support means 6 and forks 8, the link arm 29 and knee joint 9, as well as co-operating hydraulic actuators 23, 33, 21 and 50 is described below.

Before that it may be preferable to define the symbols used in the hydraulic circuit diagram.

Symbols for lines shown in FIG. 3 are briefly described hereinafter:

$h_1$: designates a delivery line from a hydraulic pump or source P, $h_2$: a drain line lead to a tank T, $h_3$: a hydraulic circuit connecting said line $h_1$ to a directional control valve 53, $h_4$: a hydraulic circuit connecting said directional control valve 53 to said tank T, $h_5$ and $h_6$: a hydraulic circuit connecting said directional control valve 53 to a six-way directional control valve 56, $h_7$ and $h_8$: a hydraulic circuit connecting said six-way valve 56 to hydraulic actuator 19 controlling said pair of links 9, $h_9$ and $h_{10}$: a hydraulic circuit connecting a four-way valve 156, mechanically joined to said six-way valve 56 to a hydraulic actuator 49, $h_{11}$: a hydraulic pilot line connecting a three-way directional control valve 52 to a spool-head chamber of said six-way valve 56, $h_{12}$ and $h_{13}$: respectively a hydraulic circuit connecting said six-way valve 56 to a three-position four-way valve 57, $h_{14}$ and $h_{15}$: lines connecting said six-way valve 56 to said five-way directional valve 57, a five-way twin-valve or a combination valve of two five-way valves 57 and 157, $h_{20}$: a branch line connecting said circuit $h_{15}$ to an end of a hydraulic cylinder 23, $h_{16}$ and $h_{17}$: a hydraulic circuit connecting a four-way directional control valve 256 which is mechanically fixed to said six-way valve 56, to said five-way valve 57, $h_{18}$ and $h_{19}$: a hydraulic circuit connecting said four-way valve 156 to said five-way valve 57, $h_{21}$: hydraulic circuit connecting said five-way valve 57 to an end of another hydraulic cylinder 33, $h_{22}$: a hydraulic circuit connecting an end of said cylinder 23 to an end of said cylinder 33 crosswisely in such a way as illustrated in FIG. 3, $h_{23}$ and $h_{24}$: a hydraulic circuit connecting said five-way valve 57 to said circuit $h_{22}$ and said circuit $h_{17}$ to said circuit $h_{22}$.

Referring to FIG. 3, P designates a pump, T designates a tank and 51 designates a control valve manifold arranged on the body side of the truck, including the three-way valve 52 and the three-positioned four-way valve 53.

Number 54 designates a relief valve arranged as illustrated in FIG. 3, and 55 designates a valve manifold arranged on the guide way 1.

Numbers 25 and 35 designate cylinder tubes of the cylinders 23 and 33, respectively, and on each is mounted two pairs of sprocket wheels 26, 27 and 36, 37, respectively.

Letters A and B and C and D respectively designate chambers defined by the double acting stationary pistons 24 and 34 and the movable cylinders 23 and 33.

Small letters "*a*" and "*b*" designate respectively a position for various directional control valves.

The six-way directional control valve 56 is combined with two four-way valves 156 and 256, the former of which controls the piston 50 and the latter the piston 21. These three valves are to be shifted in unison against pressure of a spring 58 by actuating the pilot line $h_{11}$. In this shifted condition of these valves parallel movement of the two cylinders 23 and 33 occurs i.e., traverse movement of the carriage 6 across the guide track occurs, as shown in FIGS. 6 and 10.

Figure 9:
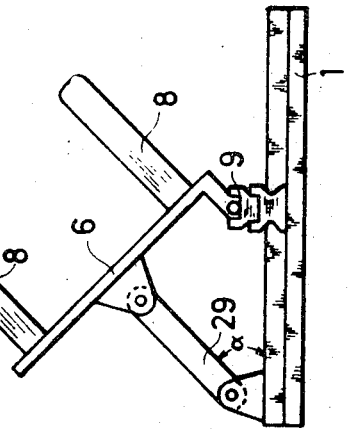

When the valve 56 is not shifted, the five-way directional control valve 57 in combination with the same five-way valve 157 controls selectively the movement of either the cylinder 23 or the cylinder 33 (referring to FIGS. 3-A and 3-B), then swinging movement of the carriage 6 occurs as shown in FIGS. 7 and 9 and the direction of the swinging is determined by the position of the carriage 6, i.e., when the carriage is furtherest to the left it swings to the right, and vice versa.

A three-position four-way valve 57' is arranged in parallel to the valve 57 and these two valves are shifted, referring to FIGS. 5 and 3-A, by a lever 60 or 61 either of which is pushed by the movement of the cylinder 23 which controls the traverse position of the knee joint 9.

Note that the function of the valve 57' is the prevention of swinging movement for the carriage 6, except at the extreme right of left position.

Control of the hydraulic system by a single lever 63 referring to FIG. 4 is described below. The control lever 63 is pivotably supported by a supporting arm 64 fixed to the body of the truck as shown in FIG. 1-A, passing through a longitudinal opening 67 of a yoke 66 which is connected to a spool (not shown) of the valve 52 and connected loosely to another yoke 68 which is connected to a spool (not shown) of the valve 53.

For the traverse movement as shown in FIG. 6, the lever handle 63 is at first inclined to the direction of an arrow c, then the valve 53 is shifted to the lower position as shown in FIG. 3-C, high pressure oil from the pump P flows in the pilot line $h_{11}$ to shift the valve 56 to "b" position. In this position if the handle 63 is inclined to the direction of an arrow $b_2$, the four-way valve 53 is lowered and the pressure oil flows through the valve 56 to the D-chamber to shift the cylinder 33 to the left direction in FIG. 3-C as well as the cylinder 23 because the chamber C of the cylinder 33 is connected by a line $h_{22}$ to chamber B of the cylinder 23, in other words a traverse motion across the guide track 1 occurs to the carrier 6 as shown in FIG. 6 due to the simultaneous movement of slidable members 13 and 31, respectively, fixed on the chains 28 and 38.

If the lever 63 is inclined to the direction c and then to the direction $b_1$ noting FIG. 4, then in FIG. 3-C pressure oil flows to the line $h_6$ and the traverse motion across the guide track 1 goes in the opposite direction as shown in FIG. 10.

Referring to FIG. 3-A, in this case the lever handle 63 is inclined to the direction of arrow $a_2$, i.e., the four-way valve 53 is lowered, while the three-way valve 52 is in the upper position, the pressure oil from the pump P flows through the valve 53 in the lowered position and the valve 56 in the "a" position to the valves 57' and 57 both in the "b" position. Thus the pressure oil flows in two ways, one to the B-chamber of the cylinder 23 and the other to the cylinder 49, therefore the piston 50 moves forward to release the latch means of FIG. 2 at the same time to swing the link arm 29 by pushing the arm on the side, or to make the angle α, (see FIGS. 7 and 9) between the arm 29 and the guide track increase, and at the same time the cylinder 23 moves to the leftward direction due to flow of hydraulic fluid to chamber B as indicated by an arrow in FIG. 3-A. The cooperative motion between the cylinder 23 and the piston 50, i.e., between the traverse motion of the knee joint 9 and the swinging motion of the link arm 29, enable a turning or swinging motion of the carriage 6 from starting position in FIG. 8 to FIG. 10 via FIG. 9.

Referring to FIG. 3-B which differs in the position of the valve 57', 57 and 157 from FIG. 3-A, in FIG. 3-B all these valves take the position "a." When the lever 63 in FIG. 4 is pushed to the direction of the arrow $a_2$, the cooperative movement between the cylinder 33 and the piston 21 which controls the posture of said knee joint or between the bending motion of the knee joint 9 and the traverse motion of the link arm 29, enables the swinging motion of the carriage 6 with such a successive change as from the position shown in FIG. 6 to FIG. 8 via FIG. 7. when the lever 63 is pushed to the contrary to the direction of the arrow $a_1$, under the condition of the three valves 57', 57 and 157 being in position "a," the pressure oil flows simultaneously into the chamber B of the cylinder 23 and the chamber C of the cylinder 33 and both having been shifted to the left position or the opposite position illustrated in FIG. 3-B, the cylinder 33 can only move to the right direction, while the same pressure oil flows at the same time into the cylinder 19 to push the piston 21 forward. The cooperative movement of the cylinder 33, i.e., the traverse motion of the slidable member 31 or the link arm 29 and the forward motion of the piston 21 or extension of the knee joint 9, facilitates the swinging motion successively from the position of FIG. 8, to FIG. 7 and then to FIG. 6.

From the description aforementioned it may be made clear that the present invention teaches how to swing the load support means 6, 8 within the minimal space, i.e., to swing the carriage 6 only at the extreme end of the guide track 1 so that no part of the carriage 6 or the fork 8 comes out side of the lines set perpendicular at both ends of the guide track 1, i.e. the breadth of an aisle necessary for the truck's operation can be reduced as narrow as the length of the guide track 1. Another merit of the truck in accordance with this invention is that the carriage 6 is always supported by at least a line of the pin 30 and a point of the pin 18, in other words the carriage is supported rigidly and stably.

A further merit of the truck in accordance with the present invention is that the number of hydraulic lines passing before the operator's eyes can be made minimal, in other words the operator's visual field is subjected to the minimum number of obstacle.

A further merit is that the truck in accordance with the present invention can be controlled by a single lever for the swing motion and the traverse shifting of the carriage.

The upward and downward movements of the guide track 1 on the uprights 100 is carried out in accordance with known techniques.

What is claimed is:

1. In an industrial truck having a guide means, a load support means, a pair of connecting means each of which is hinged on one side to said load support means and on the other side to a corresponding one of a pair of members, each member being slidably engaged with said guide means, and a first and second actuator arranged on said guide means each connected to one of said pair of members for individual or simultaneous sliding of said members;

the improvement in which one of said connecting means is a knee joint having a pair of links hinged to each other, one of which is provided with a third actuator to control the posture thereof, and the other of said connecting means is a link arm.

2. An industrial truck in accordance with claim 1 wherein said knee joint is operable only when the one of said slidable members hinged to said knee joint is shifted at one end position of said guide means.

3. An industrial truck in accordance with claim 2 wherein said guide means is provided with a fourth actuator which is able to swing said link arm only when said slidable member hinged to said link arm is positioned at an extreme end on said guide means.

4. An improvement as claimed in claim 3 wherein a latch means is provided to connect temporarily said load support means to said link arm.

5. An improvement as claimed in claim 4 wherein said fourth actuator for pushing said link arm is mounted on said slidable member hinged to said link arm to fulfill another function of releasing said latch means.

6. An industrial truck in accordance with claim 2 wherein there are provided a first and a second valve means, both of which have available at least two positions and wherein when said first valve means takes one position said second valve means permits the actuation of said second actuator to slide said link arm and said third actuator to bend said knee joint when said second valve is at a first position where said slidable member hinged to said knee joint is positioned at one extreme end position on said guide means, and said second valve means permits the actuation of said first actuator to slide said knee joint and said fourth actuator to swing said link arm when said second valve means is in a second position where said slidable member hinged to said link arm is located at the other extreme end portion on said guide means.

7. An improvement as claimed in claim 6 wherein each of said first and second actuators is a double acting hydraulic cylinder.

8. An improvement as claimed in claim 7 wherein a single lever is provided to control simultaneous parallel movement of said pair of hydraulic actuators or independent motion of one of said hydraulic actuators and at the same time a movement for one of said other two actuators.

9. An industrial truck in accordance with claim 1 wherein there are provided a first and a second valve means, both of which have available at least two positions and wherein when said first valve means takes one position said second valve means permits the actuation of said second actuator to slide said link arm and said third actuator to bend said knee joint when said second valve is at a first position where said slidable member hinged to said knee joint is positioned at one extreme end position on said guide means, and said second valve means permits the actuation of said first actuator to slide said knee joint when said second valve means is in a second position where said slidable member hinged to said link arm is located at the other extreme end position on said guide means.

* * * * *

UNITED STATES PATENT OFFICE
CERTIFICATE OF CORRECTION

Patent No. 3,837,515            Dated September 24, 1974

Inventor(s) Shuji OHTA

It is certified that error appears in the above-identified patent and that said Letters Patent are hereby corrected as shown below:

Column 1, line 20, ";" should read --:--

Column 1, line 32, after "extreme" insert --end--

Column 5, line 45, after "track" insert --1--

Column 5, line 65, change "when" to --When--

Signed and sealed this 3rd day of June 1975.

(SEAL)
Attest:

RUTH C. MASON
Attesting Officer

C. MARSHALL DANN
Commissioner of Patents
and Trademarks